United States Patent [19]

Hoefelmayr et al.

[11] Patent Number: 4,499,854
[45] Date of Patent: Feb. 19, 1985

[54] APPARATUS FOR CONVEYING MILK USING AN UNDERPRESSURE

[75] Inventors: Tilman Hoefelmayr, Niederteufen, Switzerland; Jakob Maier, Tuerkheim, Fed. Rep. of Germany

[73] Assignee: Biomelktechnik Hoefelmayr & Co., Niederteufen, Switzerland

[21] Appl. No.: 415,869

[22] Filed: Sep. 8, 1982

[30] Foreign Application Priority Data

Sep. 16, 1981 [DE] Fed. Rep. of Germany ....... 3136841

[51] Int. Cl.³ .................................................. A01J 7/00
[52] U.S. Cl. ............................... 119/14.32; 119/14.34; 119/14.44
[58] Field of Search ............... 119/14.05, 14.08, 14.17, 119/14.32, 14.41, 14.44, 14.34; 137/110

[56] References Cited

U.S. PATENT DOCUMENTS

| 2,814,270 | 11/1957 | Bramley | 119/14.05 |
| 3,375,845 | 4/1968 | Behm | 137/110 |
| 3,538,768 | 11/1970 | Duncan | 119/14.17 |
| 3,783,837 | 1/1974 | Olander | 119/14.08 |
| 3,943,888 | 3/1976 | Nordegren et al. | 119/14.05 |

Primary Examiner—Hugh R. Chamblee
Attorney, Agent, or Firm—Flynn, Thiel, Boutell & Tanis

[57] ABSTRACT

An apparatus for conveying milk with the help of an underpressure in a pipe system which includes feedpipes comprises damming devices or check valves in the feedpipe, or a division of the feedpipe over at least a portion of its length into several pipes which preferably have various inside cross sectional areas and have valves which, in dependence on the milk flow rate, cause the cross sectional area of one or more pipes to be changed. In a preferred embodiment, the invention is part of a milking apparatus having milk discharge pipes which are supported overhead.

17 Claims, 16 Drawing Figures

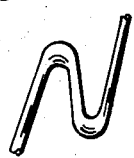
Fig. 2
Fig. 3
Fig. 4
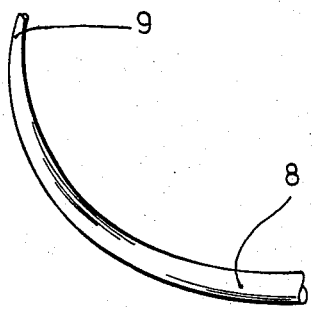
Fig. 5
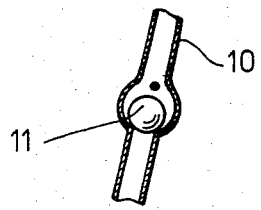
Fig. 6
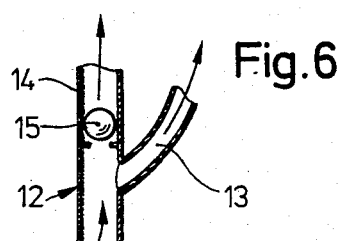
Fig. 7
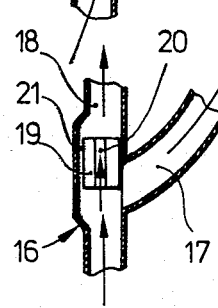
Fig. 8
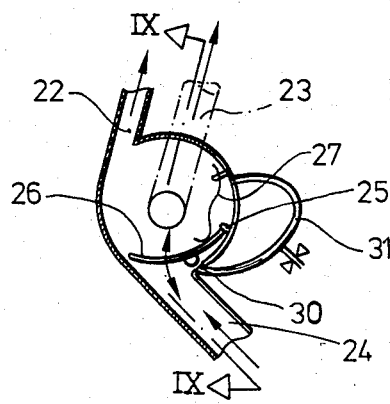
Fig. 9
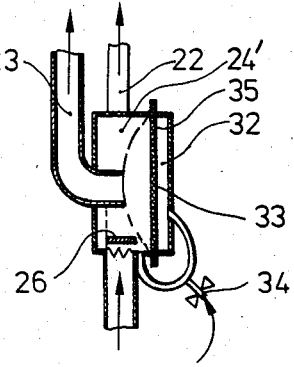

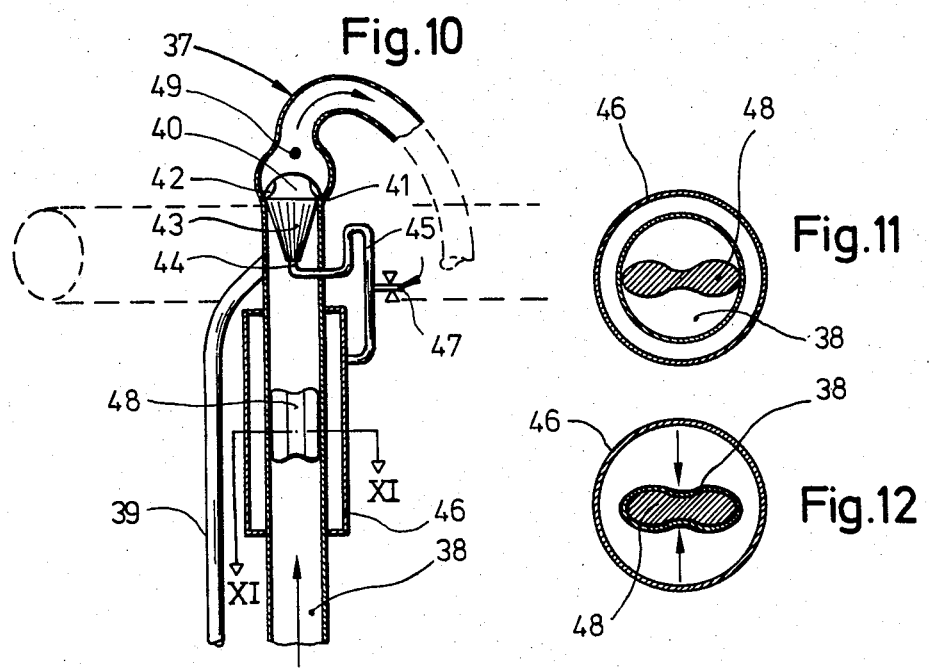
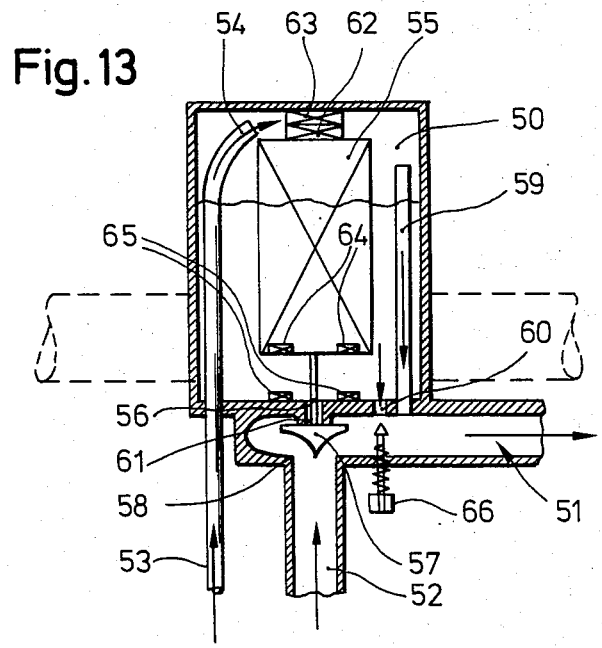

APPARATUS FOR CONVEYING MILK USING AN UNDERPRESSURE

FIELD OF THE INVENTION

This invention relates to an apparatus for conveying milk with the help of an underpressure and, more particularly to a milking apparatus which includes milk discharge pipes and feedpipes which lead to the milk discharge pipes.

BACKGROUND OF THE INVENTION

During conveying of milk with the help of an underpressure over a long distance and in particular through feedpipes, there exists the danger that the milk will change from its original state and spoil as a whole. This may, for example, be due to the fact that, during conveying, the thin albumen membranes which surround the fatty globules in the milk can be damaged mechanically, after which the unprotected fat can be attacked by fat-cleaving enzymes commonly called lipases. In this case, a relatively significant cleaving of various free fatty acids (FFA) takes place. Of these, the butter acid is in particular mentioned because of its rancid taste. Long-chain free fatty acids, for example stearic acid, can produce a soapy taste in the milk and in milk products. During the destruction of the fatty globules, free fat is also formed in addition to the free fatty acids, namely, fat which has lost its globule structure and behaves physically differently than the undamaged fatty globules. Since free fat has a greater tendency to be distributed unevenly, it makes it more difficult to pull a representative fat sample from the conveyed milk and to satisfactorily separate out the fat.

The amount of free fatty acids present in milk is usually given in terms of a milli-equivalent per liter of milk (mequ./1). In the case of values of between 1.5 and 2.0, depending on the composition of the free fatty acids, the consumer will typically be very aware of a poor taste of the milk or milk products. Therefore, in the case of milk which is to be transported from a farm, a free fatty acid content of not more than approximately 1.0 mequ./1 is desirable in order to leave an allowance for influences at the dairy, for example milk transport outside and within the dairy, the time period until pasteurization, and so forth.

As is known, lipases are always present in milk. However, the production of free fatty acids varies widely. It has been found that an increased amount of free fatty acids is often produced during late lactation, during relatively high milk output, when the cow is in heat or when a change in feed occurs. Furthermore, it has been found that the probability of production of free fatty acids during conveying of warm milk is substantially higher than during conveying of cold milk. The conditions under which a mechanical milking is carried out also appear to have a certain influence on the production of free fatty acids. All in all, the degree of free fatty acids which exist in the delivered milk obviously depends on a plurality of factors such as, for example, and aside from the sensitivity of the cows, the manner and carefulness of the milking routine, the quality of the milk cooling, the frequency of hauling away the milk, the design and maintenance of the milking apparatus, and many other factors. Depending on the presence and relative importance of these influencing factors, one finds FFA values in milk which has been supplied by a farm of from 0.4 up to more than 1.8 mequ./1.

One very important single factor has been found to be the type of milking apparatus utilized. If one compares various types of modern milking apparatuses of equal quality and design which are operated under equal conditions, then the average content of free fatty acids is approximately as follows:

| Type | mequ./l |
| --- | --- |
| Bucket milking apparatus | 0.45 |
| Pipe milking apparatus with a low milking pipe (or low milk measuring cups) | 0.60 |
| Pipe milking apparatus with an overhead milking pipe (or overhead milk measuring cups) | 0.80 |
| Milk in the udder of a cow | 0.30 |

From these values it becomes clear that a relatively large difference in the production of free fatty acids is present in a pipe milking apparatus with a low milking pipe as compared to one with an overhead milking pipe. A milking apparatus with a low milking pipe which has been designed and serviced normally will, during a good milking routine and even under unfavorable conditions like late lactation, a change in feeding and so forth, rarely come into the range of 1 mequ./1, but this happens relatively frequently in a modern apparatus with an overhead milking pipe. On the other hand, the milking apparatus with an overhead milk discharge pipe is very common in the classic family operation with a tie-up stall in most countries which produce milk.

The basic difference between a pipe-milking apparatus with an overhead pipe and one with a low pipe is that in the former the milk is conveyed, with the help of the underpressure or vacuum which exists in the milk discharge pipe, from the collecting piece of the milking tool through a long hose to the milk discharge pipe, which lies approximately 1.8 to 2 meters above the ground. In the case of the low milk discharge pipe, which is supported approximately at the height of the collecting piece, the upward conveying of the milk through a long milk hose is absent.

A milking machine actually has a dual purpose. It must on the one hand suck milk out of the teat, and on the other hand move the milk from the area near the teat to a storage reservoir. Both functions are accomplished by the suction force of the underpressure which exists in the milk discharge pipe. If the milk were conveyed as a continuous milk column to the milk discharge pipe, the milking vacuum which exists at the tip of the teat and with which the milk is sucked out of the teat would, especially due to hydrostatic pressure losses, become very unstable at increased milk flow rates and would decrease too far below half of the nominal vacuum. Such a process would result in unacceptable problems like falling off of the milking tool, extremely long milking times, and very poor milking completion. Furthermore, the milking vacuum would be exposed in addition to extremely cyclic variations due to the pump action of the rubber teat, which opens and closes rhythmically in connection with the mass forces of the conveyed milk. The use of such a milking vacuum at the teat would be totally impossible, both from the viewpoint of udder health and also the efficiency of the milking operation. For these reasons, standard modern milking machines each feed small amounts of air into the milking tool (approximately 8 liters per minute of air). Through this, the milk column is physically interrupted and thus lighter and more pressure elastic. In this manner, the hydrostatic pressure losses and the cyclic vacuum variations at the teat can be reduced to a tolerable degree; and only in this manner are the conditions created which make milking in a practical manner possible at all, particularly with an overhead milking pipe which is disposed approximately 2 meters high.

If the raw milk does not contain any finely distributed air and if it is cooled in addition, then an enormously high mechanical stress is needed in order to cause an increase in the FFA content which is worth mentioning. If the conveying air is intensively mixed with milk, however, three primary concerns exist with respect to the FFA content:

1. The fatty globule membranes will have a greatly increased tendency to burst along the boundary layer between the milk and the air, due to the surface tension and loading, and a fine and intensive mixing of air in the milk substantially increases the total area of this boundary surface.
2. Adding air also increases the flow rate of the discharged milk. This could cause, under particularly unfavorable conditions such as a high addition of air, narrow pipe cross sections, sharp transitions and so forth, impact and shearing forces between the moving milk particles themselves and between the moving milk particles and the pipe wall which are so high that direct destruction of the fatty globule membranes is possible.
3. If milk containing air is guided through a centrifugal pump, a considerable damage of the albumen membranes can occur. For this, just a small percentage of air which cannot even be seen with the naked eye is sufficient.

A basic purpose of the present invention is therefore to provide an apparatus of the above-mentioned type in which the milk is guided through feedpipes but in which the FFA values are not significantly increased as the milk is conveyed.

To explain the general thought of the invention, it is first pointed out that it was found that in an inclined pipe, a milk and air mixture can flow in two layers, the heavier milk moving at the bottom in the pipe and the air passing over it. The milk in this case flows due to the force of gravity.

In a feedpipe however, the conveying of the milk can occur only through a pressure difference between the upper and the lower end of a milk column or one or more milk plugs. A plug formation is therefore necessary in a feedpipe during the conveying method with the help of an underpressure. However, this has the result that the inside diameter of the feedpipe cannot be chosen too large, even though, due to the need to minimize flow losses and thus vacuum losses in the milking tool, it is absolutely necessary to strive for an inside diameter of the feedpipe which is as large as possible. It has now been determined that, at cross sections of the feedpipe which are too large or at milk flow rates which are too small, the conveying of the milk no longer occurs smoothly and steadily because, under these conditions, proper milk plug formation becomes increasingly difficult. The conveying air which is added to the milk breaks increasingly under these conditions through the milk plug which is to be moved, and the plug residues flow back along the feedpipe until a new plug is formed or until all the milk as drops or as droplets is carried whirlingly along through the upwardly flowing conveying air.

In addition, since the amount of conveying air added is practically the same for each milking phase, there results as an additional complication the fact that the added amount of air is generally chosen so that, for maximum milk flow, a favorable discharge of the milk is assured. Thus, in this particular situation, a balance exists between the milk flow and the amount of conveying-air added. At the start and end of a milking cycle, however, the milk flow is substantially less than the maximum milk flow. In the case of a typical milk flow curve, the peak milk flow is relatively short. For example, during 50% of the milking time, the milk flow typically reaches only about 10%–20% of the maximum milk flow. During late lactation or, for example, because of uneven milking intervals (during evening milking), significantly smaller milk amounts are milked, causing the unbalance to be further sharpened. A greatly increased danger of dissolving the milk plugs and of conveying a pure air-milk mixture exists in these cases.

SUMMARY OF THE INVENTION

The set purpose is attained according to the basic thought of the present invention by providing arrangements of the type discussed below, so that the milk, as much as possible, is conveyed through the entire feedpipe in the form of a plug.

According to a first realization of the invention, the basic purpose of the invention is attained by providing damming or accumulating devices or stages in the feedpipe. The damming devices are preferably provided in the form of a siphon or a loop constructed in the feedpipe.

In as far as feedpipes are often constructed in the form of sagging hoses or pipes, according to a different solution of the set purpose the hose or the pipe is constructed so that its internal cross sectional area is reduced in steps or continuously from its lower end toward its upper end at the milk discharge pipe. With this, a breaking open of the milk plug at the upper end of the feedpipe is safely prevented.

A further alternative solution to the set purpose is characterized by at least one milk flow-back resisting device being provided in the feedpipe. With this, the forming and maintaining of closed milk plugs is dependably achieved. The milk flow-back resisting device can be constructed for example in the form of vane flaps or a check valve.

A further thought of a solution to the set purpose includes the feedpipe being formed as several separate pipes which, in dependence on the milk flow rate, are selectively opened or closed to the flow of milk. In this manner, the cross sectional area of the feedpipe can be adjusted to an optimum for the milk plugs at various heights in the feedpipe and at various flow rates.

According to a simple development of the invention, valves are provided at the lower ends of all the pipes, with the exception of one pipe. These valves can be controlled in dependence on the milk flow rate. A simple development of such a valve when the feedpipe is formed as two pipes involves the provision of a cylinder in one of the two pipes, such cylinder being movable in said pipe and having a longitudinal bore, and the cylinder, depending on its position, closing off or increasingly exposing the opening into the second pipe. A different advantageous development of the invention includes a sensor being provided in the pipe with the small inside cross sectional area or in the feedpipe, which sensor is responsive to the milk flow rate and, when the flow rate exceeds a predetermined rate, opens a diaphragm valve which is usually kept in a closed condition in which it closes off access to the pipe with the larger inside cross sectional area.

According to a further solution of the set purpose, an apparatus is provided which is distinguished inventively by the feedpipe being formed, at least over a portion of its length, as two pipes with preferably different inside cross sectional areas, the pipe with the smaller inside cross sectional area being guided through a milk accumulating receptacle having an overflow pipe and a drain opening, the size of the drain opening being on the order of magnitude of the inside cross sectional area of the pipe with the smaller inside cross section. A float is coupled with a valve inside the milk accumulating receptacle and, in dependence on the milk level in the milk accumulating receptacle, is movable between a first position in which the valve keeps the pipe with the larger inside cross sectional area closed and a second position in which the valve opens such pipe. Such a construction has the advantage that, in the feedpipe with the larger inside diameter, no additional pressure drop of the type produced by a damming stage or accumulating chamber is caused.

Holding magnets are preferably provided on top of the float and also on its underside, which magnets cooperate with magnets on the housing so that the float can be releasably secured in its first and second positions so as to act as a bistable element. In this manner, repeated switching between an open and a closed condition of the pipe with the larger inside cross sectional area during a gradual change in the milk flow rate is avoided.

In a similar manner, it is possible to provide a snap switch which can be operated by the float in dependence on its position, which snap switch also permits bistable switching between an open and a closed condition of the second pipe with the larger inside cross sectional area.

According to a further preferred embodiment, the apparatus is constructed so that the feedpipe is formed, at least over a portion of its length, as two pipes, preferably with different inside cross sectional areas. A milk accumulating receptacle is provided, into which project the two pipes, which are open at their upper ends. Two drain openings are provided and have cross sectional areas which respectively correspond to the pipes with the smaller and larger cross sectional areas. A float is provided which is coupled with a first valve which is provided at the upper end of the pipe with the larger cross sectional area and with a second valve which is provided at the drain opening with the larger cross sectional area and, in dependence on the milk level in the milk accumulating receptacle, the first and second valves are simultaneously opened or closed.

According to a further solution to the set purpose, the apparatus according to the invention is constructed so that the feedpipe, at least over a portion of its length, is formed as two pipes, preferably with different inside cross sectional areas. The two pipes are connected to an electronic milk flow meter, and a valve is arranged upstream and/or downstream of the milk flow meter in the pipe with the larger inside cross sectional area. These valves can be opened or closed in dependence on the measured milk flow rate.

As has been found in a surprising way, the inventive solutions have the following advantages:
1. The amount of free fatty acids produced can be noticeably reduced.
2. A smaller amount of free fat is produced, thereby providing better capability for separating the fat and easier removal of a representative fat sample from a milk storage reservoir.
3. A reduced formation of foam in the milk is achieved. This facilitates better hygiene in the milk storage reservoir, a reduced danger of the milk storage reservoir overflowing, and a simpler reading of the amounts of milk in the reservoir with the help of measuring devices.
4. The vacuum which exists during the various phases of the milking process is noticeably stabilized.
5. The danger that mastitis agents will be transmitted from one cow to another by milk returning from the milk discharge pipe when the other cow is just being milked dry is reduced considerably.

The present invention is particularly suited for a milking apparatus with an overhead milk discharge pipe or milk measuring cups which lead up to the feedpipes. The invention, however, can be advantageously used in general in any apparatus in which milk is conveyed with the help of an underpressure and must pass through feedpipes.

BRIEF DESCRIPTION OF THE DRAWINGS

The invention is discussed in greater detail hereinafter in connection with preferred exemplary embodiments which are illustrated in the drawings, in which:

FIG. 2 is a perspective view of a portion of a feedpipe which has the shape of a siphon;

FIG. 3 is a perspective view of a portion of a feedpipe which has the shape of a loop;

FIG. 4 is a perspective view of a further embodiment of a feedpipe;

FIG. 5 is a sectional view of an embodiment in which a check valve is provided in a feedpipe;

FIG. 6 is a sectional view of an embodiment of a feedpipe which is forked into two pipes, a check valve being provided in one pipe;

FIG. 7 is a sectional view of a portion of a feedpipe which is split into two pipes and has a valve which is controlled in dependence on the milk flow rate;

FIG. 8 is a longitudinal sectional view of a portion of a feedpipe having a valve which is controlled in dependence on the milk flow rate;

FIG. 9 is a sectional view of the feedpipe of FIG. 8 taken along the line IX—IX in FIG. 8;

FIG. 10 is a sectional view of a further embodiment of a feedpipe having a valve which is controlled in dependence on the milk flow rate;

FIG. 11 is a sectional view of the arrangement in FIG. 10 taken along the line X—X, in which a valve which includes a flexible hose is shown in its open condition;

FIG. 12 is a sectional view similar to FIG. 11 in which the valve is illustrated in its closed position;

FIG. 13 is a sectional view of a milk accumulating receptacle which is arranged in a feedpipe;

DETAILED DESCRIPTION

Figure 1:
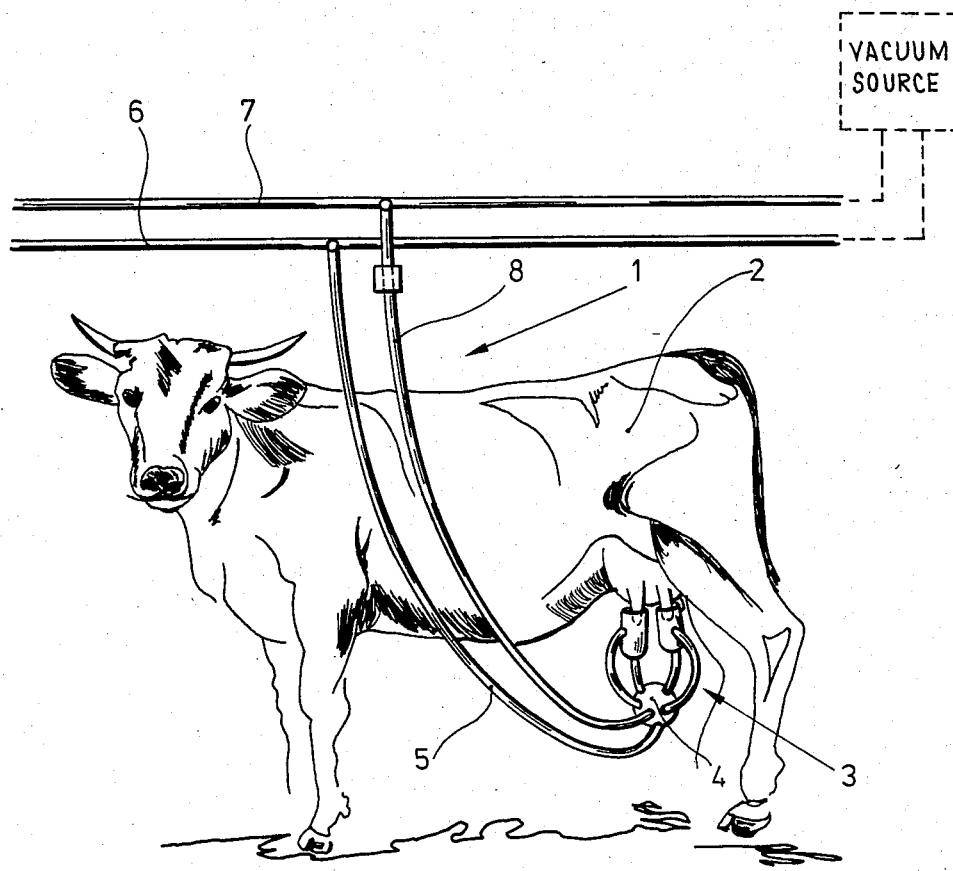
FIG. 1 is a perspective view of a milking apparatus having a milk discharge pipe which is installed overhead and a feedpipe which leads from the milking tool to the discharge pipe.

FIG. 1 illustrates a conventional milking apparatus which is generally identified with reference numeral 1 and is supported in a conventional manner at a location where a cow 2 stands. Milk is milked from the cow 2 with the help of the milking tool 3 applied to the teats of the cow, is collected in a collecting device 4, and is moved by underpressure or vacuum through a common feedpipe 5 to a milk discharge pipe 6 which is arranged overhead. A pipe 7 is provided which extends parallel to the milk discharge pipe 6. A conventional and not illustrated pulsator is connected to the pipe 7, and, through a further pipe 8, alternately applies a vacuum and atmospheric pressure to the milking tool 3. The feedpipe 5 is typically a flexible pipe or hose which extends in a generally sagging chain line.

The present invention is directed to arrangements adapted to improve the milk flow through the feedpipe 5 in a manner which minimizes increases in the FFA values.

FIG. 2 illustrates a first embodiment of an accumulating or damming device or stage for a feedpipe. This damming device is constructed in the form of a siphon. A different embodiment of a damming device is illustrated in FIG. 3, in which a feedpipe has a portion constructed in the form of a loop. At least one such damming device is advantageously provided in the feedpipe, preferably at one-half to two-thirds of the height of the feedpipe. At this height, the danger of a dissolving of a milk plug increases substantially, because the initial conveying thrust expires at about this point. These damming devices permit construction of the feedpipe with a relatively large cross section, so that only a relatively small vacuum drop occurs at the teats. The important advantage of the damming stages is their capability for ensuring a properly closed milk plug, inasmuch as at low milk flow rates the danger of droplet formation will otherwise exist. With this, the milk can also be moved upwardly with a small milk flow rate in a few thrusts and does not whirl up and down for a long time.

FIG. 4 illustrates a feedpipe having an inner cross sectional area which decreases continuously from the lower end 8 thereof to the upper end 9. The cross sectional area of the feedpipe could also be reduced discontinuously in steps, but such an arrangement has not proven quite as favorable in use. The advantage of this arrangement is that it is particularly simple and permits, in spite of a relatively small vacuum drop at the teats, maintenance of continuous milk plugs, even in the upper, critical part of the feedpipe.

FIG. 5 illustrates a feedpipe 10, in which is provided a milk flow-back resisting device in the form of a ball check valve 11. A satisfactory check valve could alternatively be provided in the form of so-called vane flaps. When only a check valve is provided in the feedpipe, then it is preferably mounted at approximately 60% of the height of the feedpipe. If two check valves are provided, then an arrangement thereof at respective heights of approximately 50% and 75% of the height of the feedpipe has proven advantageous.

FIG. 6 illustrates a lower portion of a feedpipe 12 which is split into a first pipe 13 and a second pipe 14. The cross sectional area of the first pipe 13 is preferably less than that of the second pipe 14. A ball check valve 15 is provided in the second pipe 14. The ball 15 preferably has a weight and the valve seat preferably has a diameter so that, at low milk flow rates, the entire milk flow passes through the first pipe 13, and only at larger milk flow rates and an increasing pressure drop at the ball 15 does opening of the check valve occur and permit milk to flow through both of the pipes 13 and 14. At a sufficient milk flow rate, it is assured in this arrangement that a continuous milk plug is formed both in the pipe 13 and in the pipe 14.

A different embodiment, shown in FIG. 7, has a valve in the form of a cylindrical member 19 which is movably supported in a second pipe 18 and in the lower part of a feedpipe 16, the feedpipe 16 being forked to define a first pipe 17 and the second pipe 18. The cylinder has a central longitudinal bore 20 therethrough and is movably guided in the pipe 18 so that, through a longitudinal groove 21 and even at a small milk flow rate, milk can flow through the second pipe 18. At a small milk flow rate, the cylindrical member 19 is in a lowered position in which it completely closes off the lateral opening the wall of the pipe 16 which serves as the mouth of the first pipe 17. With an increase in the milk flow rate, the cylindrical member 19 is lifted into a position by the impulselike conveyed milk in which the mouth of the first pipe 17 is exposed. In this manner, it is possible to change, in dependence on the milk flow rate, the cross sectional area of the feedpipe. The advantages of this arrangement include not only its simple design, but also a particularly low pressure loss, because its actuation, due to the lateral arrangement of the mouth of the pipe 17, requires only a very small pressure change.

A different possibility for controlling the cross sectional area of the feedpipe with the help of a valve in dependence on the milk flow rate is illustrated in FIGS. 8 and 9. In this embodiment, the feedpipe 24 forks upwardly into a first pipe 22 with a small cross sectional area and a second pipe 23 with a larger cross sectional area. The upper end of the feedpipe 24 communicates with a chamber 24' in which, at the mouth of the pipe 24, is provided a sensor in the form of a flap which can be swung about a pivot point 25. The flap is biased by a spring 27 toward a position in which it closes the upper end of the feedpipe 24. The flap 26 can be swung to a slightly open position at low milk flows, due to the impulse momentum which carries along the milk plugs, so that the milk can enter the chamber 24 and pass therethrough into the first pipe 22. The flap 26 has a plug 30 thereon which, in the initial position of the flap 26, closes a control pipe 31 which leads to a control chamber 32 for controlling a diaphragm 35 of a diaphragm valve 33. The pipe 31 is connected to the atmosphere through a throttle or constriction 34. If the flap 26 is in the initial position or is swung only slightly by a low milk flow rate, as illustrated in FIG. 8, then the plug 30 keeps the pipe 31 substantially closed so that the control chamber 32 is at atmospheric pressure, due to air entering throttle 34. In this case, the diaphragm 35, since an underpressure or vacuum exists in the chamber 24, is pressed by atmospheric pressure against the end of the second pipe 23, as is illustrated by dashed lines, so that the pipe 23 is closed off. In this case, the milk passes only through the first pipe 22, and the chamber 24 serves as an accumulating or damming chamber. During greater milk flow rates, however, the flap 26 is held almost constantly in a more fully swivelled position in which the plug 30 no longer obstructs the pipe 31. Thus, since the throttle 34 has a small opening, the underpressure which exists in the chamber 24 is applied to the control chamber 32 of the diaphragm valve. Since the pressure on both sides of the diaphragm 33 is then substantially uniform, it returns resiliently to its undeflected position shown in solid lines in FIG. 9, in which the end of the second pipe 23 is exposed. Starting at this point in time, the first pipe 22 and the second pipe 23 are both utilized for conveying the milk.

FIG. 10 illustrates a feedpipe which in general is identified with reference numeral 37 and which has its lower portion divided into first and second pipes 38 and 39. The second pipe 39 opens into the first pipe 38 below a float 40 which is provided in the first pipe 38. The float 40 is an approximately frusto-conical part having an upper edge 41 which can engage a seat 42 provided in the pipe 38. Grooves 43 which extend in a longitudinal direction are provided in the outer surface of the float 40 and permit milk to flow past the float 40 when it is in the illustrated lowered position in which its upper edge 41 rests against the seat 42. In this lowered position, the float 40 closes off the inner end 44 of a pipe 45 which projects into the pipe 38. The other end of the pipe 45 communicates with a control chamber 46 which surrounds the pipe 38. The portion of the pipe 38 within the chamber 46 is an elastic hose preferably having a length the same as that of the control chamber 46. The pipe 45 communicates with the atmosphere through a throttle 47. A core 48 which is shaped approximately as a figure-8 or an hourglass (FIG. 11) in a horizontal cross section is supported in the pipe 38 at the height of the control chamber 46.

This arrangement operates as follows. At low milk flow rates, the milk flows through the second pipe 39, past the float 40, which is in its lowered position, and into the upper part of the feedpipe 37. Since in this position of the float 40 the upper end 44 of the pipe 45 is closed off, the control chamber 46 is, due to air entering the throttle 47, at atmospheric pressure. Since the inside of the pipe 38 is subject to a vacuum, the elastic hose portion of the pipe 38 is sealingly pressed against the rod or core 48, as illustrated in FIG. 12. The pipe 38 is thus closed to milk flow under these conditions. When the milk flow rate increases, the float 40 is lifted and moves to an upper position in which it rests against the fixed stop 49. The upper end 44 of the pipe 45 is thus exposed and the underpressure in the pipe 38 is thus applied to the control chamber 46. This allows the elastic hose portion of the pipe 38 to resiliently return to its undeformed shape, illustrated in FIG. 11, since the same pressure exists on both its outer and its inner sides. In this position of the elastic hose portion, the passage through the pipe 38 is open so that milk can flow through both the first and the second pipes 38 and 39. The described valve arrangement is preferably provided at the upper end of the feedpipe so that the milk which has passed the float 40 can flow with practically no further expenditure of energy into the milk discharge pipe, which is not illustrated in detail.

A different embodiment is illustrated in FIG. 13, in which a milk accumulating housing is provided in a feedpipe which is identified in general with reference numeral 51. The lower part of the feedpipe 51 is separated into first and second pipes 52 and 53. The pipe 53 extends into the milk accumulating housing and its open upper end extends to a point adjacent the top of the milk accumulating housing. A float 55 is vertically movably supported in the milk accumulating housing and is rigidly connected to a valve member 57 through a rod 56. The valve member 57 can sealingly engage a valve seat 58 which forms the upper end of the pipe 52. An overflow pipe 59 is provided in the milk accumulating housing 50 and has its lower end communicating with the upper part 51 of the feedpipe through the top thereof. A drain opening 60 is provided in the bottom of the milk accumulating housing and also communicates with the upper part 51 of the feedpipe through the top thereof. An opening 61 is also provided around the rod 56 in the bottom of the milk accumulating housing. This opening can connect the inside of the milk accumulating housing with the upper part 51 of the feedpipe. A magnet 62 is secured to the upper end of the float 55 and can cooperate with a corresponding magnet 63 which is mounted on the underside of the upper wall of the milk accumulating housing. Furthermore, magnets 64 are provided on the underside of the float and can cooperate with magnets 65 provided on the bottom of the milk accumulating housing. The cross sectional area of the drain opening 60 can be adjusted with the help of a reducing valve 66.

This arrangement operates as follows. The reducing valve 66 is first adjusted so that the combined cross sectional area of the openings 61 and 60 is approximately the same as or slightly less than that of the pipe 53. In the case of a small milk flow rate, milk is conveyed only through the pipe 53 to the milk accumulating housing and only a relatively small amount of milk accumulates therein, so that the float 55 is in its lowered position. In this position, the float is held by cooperation of the magnets 64 and 65. In this lowered position of the float, the valve 57 sealingly closes the pipe 52. If the milk flow rate increases, then the amount of milk in the milk accumulating housing 50 will increase until a point is reached when the buoyancy of the float 55 overcomes the holding force of the magnets 64 and 65. Through this, the float is moved to a position in which the magnet 62 cooperates with the magnet 63 so that the float is held in a raised position shown in FIG. 13. In this position, the upper side of the valve 57 closes off the opening 61, while the valve 57 is spaced from the upper end of pipe 52. In this condition, milk can flow into the housing through both of the pipes 52 and 53 and then through the drain opening 60 into the upper end 51 of the feedpipe. Since in this condition the amount of milk which is conveyed through the pipe 53 is less than in the condition in which a maximum milk flow passes through only the pipe 53, the opening 61 is closed in this position. Through this, a reduced amount of milk flows out of the milk accumulating housing, so that as a whole the milk level in the milk accumulating housing is maintained substantially constant. However, if the milk flow rate decreases and the milk which flows through the pipe 53 is thereby further reduced, then this leads in the end to lowering of the milk level in the milk accumulating housing. When the milk level falls below a certain level, the weight of the float 55, due to the reduced buoyancy, becomes so great that the force of the magnets 62 and 63 is not sufficient to hold the float, and it falls back to its lowered position, which causes the valve 57 to again sealingly close the pipe 52. Then, further milk flow again occurs only through the pipe 53. The illustrated apparatus has the advantage that only the small feedpipe is guided through the milk accumulating receptacle. Thus, the receptacle can be small and tractable. Furthermore, this arrangement keeps the pressure losses caused by each accumulating receptacle particularly low, especially during a high milk flow rate. In this manner, it is achieved that, especially in this critical range, no additional vacuum drop at the teat occurs.

Figure 14:
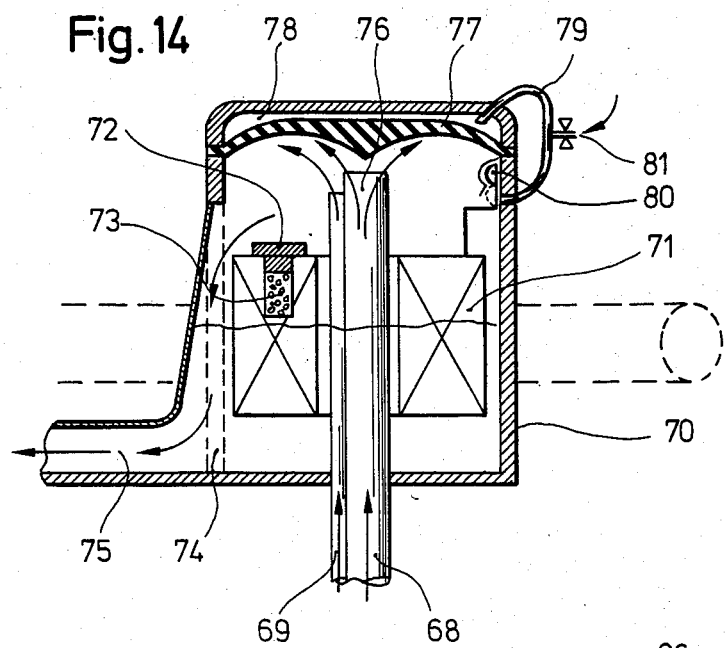
FIG. 14 is a sectional view of a further embodiment of a milk accumulating receptacle which is arranged in a feedpipe.

FIG. 14 illustrates a further embodiment in which the lower part of the feedpipe is constructed in the form of two pipes 68 and 69 which are parallel to one another and project upwardly with their open ends into a milk accumulating housing 70. In the milk accumulating housing 70, a float 71 is provided which annularly surrounds the pipes 68 and 69. A recess 73 is provided in the float 71 and can be closed off by a screw cap 72. Material with a specific gravity which is different from that of the float is placed in the recess 73 in order to precisely adjust the buoyancy of the float 71. A slot 74 which extends in a longitudinal direction and preferably vertically is provided in a side wall of the milk accumulating housing and leads to the upper part of the feedpipe, which is identified in general with reference numeral 75. The upper end 76 of the pipe 68 projects beyond the upper end of the pipe 69 and can be sealingly closed by a diaphragm 77. The periphery of the diaphragm 77 is clamped in the upper part of the milk accumulating housing and diaphragm 77 defines a control chamber 78 which is connected to the lower part of the milk accumulating housing through a control pipe 79. The end of the pipe 79 which communicates with the lower housing part can be sealingly closed by a snap switch 80. The snap switch can be moved between two predetermined positions by the float 71. A throttle 81 is provided in the pipe 79, through which the pipe 79 is connected to the surrounding atmosphere.

This arrangement operates as follows. At low milk flow rates, milk flows only through the pipe 69 and the milk level in the milk accumulating housing is extremely low, since virtually the entire milk flow passes directly through the slot 74 and into the pipe 75. In this condition, the float 71 is in a lowered position in which the snap switch 80 sealingly closes the pipe 79, so that atmospheric pressure exists in the control chamber 78, due to the throttle 81. Thus, due to the underpressure below the diaphragm, the diaphragm 77 is sealingly held against the upper end 76 of the pipe 68. If the milk flow rate then increases in the pipe 69, the milk level in the milk accumulating housing 70 will rise until the float, moving buoyantly upwardly, switches the snap switch 80 to its other position. The snap switch 80 thereby exposes the end of the line 79 in this position, so that the underpressure from the lower part of the milk accumulating housing is applied to the control chamber 78, and the diaphragm 77 moves resiliently to the position shown in FIG. 14. Through this, the upper end 76 of the pipe 68 is exposed. Starting at this point in time, the milk can flow through both the pipe 68 and the pipe 69. When the milk flow rate decreases again, the described operations take place in a reverse sequence. The described arrangement is preferably installed near the upper end of the pipe and, as much as possible, at such a height that the milk which flows through the feedpipe 75 can flow directly into the milk discharge pipe, which is not illustrated in FIG. 14.

Figure 15:
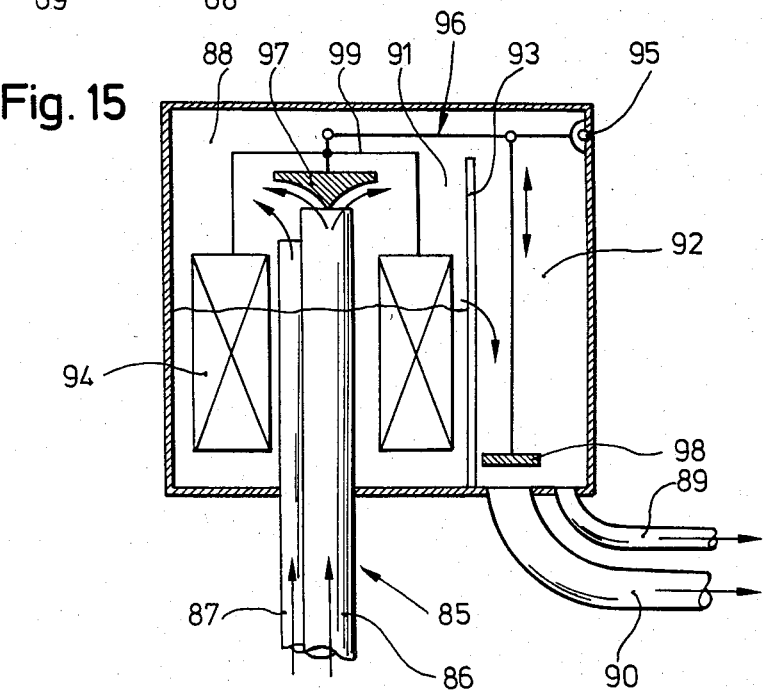
FIG. 15 is a sectional view of a still further embodiment of a milk accumulating receptacle which is arranged in a feedpipe.

In the arrangement illustrated in FIG. 15, the lower end of a feedpipe 85 is, as in the embodiment of FIG. 14, constructed in the form of two separate pipes 86 and 87. These pipes project upwardly with their open, upper ends into a milk accumulating housing 88. At the bottom of the milk accumulating housing, two separate pipes 89 and 90 are provided which form the continuation of the feedpipe. The milk accumulating housing is divided into two chambers 91 and 92 which communicate only through a vertically extending slot 93. The pipes 86 and 87 communicate with the upper portion of the first chamber 91, while the pipes 89 and 90 communicate with the lower portion of the chamber 92. An annular float 94 vertically movably surrounds the pipes 86 and 87 within the chamber 91. A linkage 96 is pivotally supported at a pivot point 95 on the inner wall of the milk accumulating housing 88. A valve member 97 and a valve member 98 are supported on the linkage 96 and simultaneously can respectively sealingly close the upper ends of the pipes 86 and 90. The float 94 is operationally connected by a link 99 to the linkage 96.

This arrangement operates as follows. At a low milk flow rate, milk flows through the pipe 87 and, since only a little milk is in the milk accumulating housing, the float 94 is in a lower position. In this float position, the linkage 96 is swung so that the valve members 97 and 98 close the pipes 86 and 90. In this case, the milk which arrives through the pipe 87 flows through the slot 93, flows into the chamber 92 and is discharged therefrom through the pipe 89 which preferably has a cross sectional area approximately equal to that of the pipe 87. At an increased milk flow rate, the level of the milk in the chamber 91 increases and the float 94 is buoyantly raised and pivots the linkage 96 until the valve members 97 and 98 expose the openings of their associated pipes 86 and 90. In the case of a decreasing milk flow rate, the same operation takes place in a reverse sequence. Since in this arrangement both the supplying of milk to the milk accumulating receptacle and the discharge of milk therefrom are controlled by valves, particularly low FFA values are achieved. Furthermore, it is possible to insert this apparatus at either the lower or the upper end of the feedpipe, or therebetween.

Figure 16:
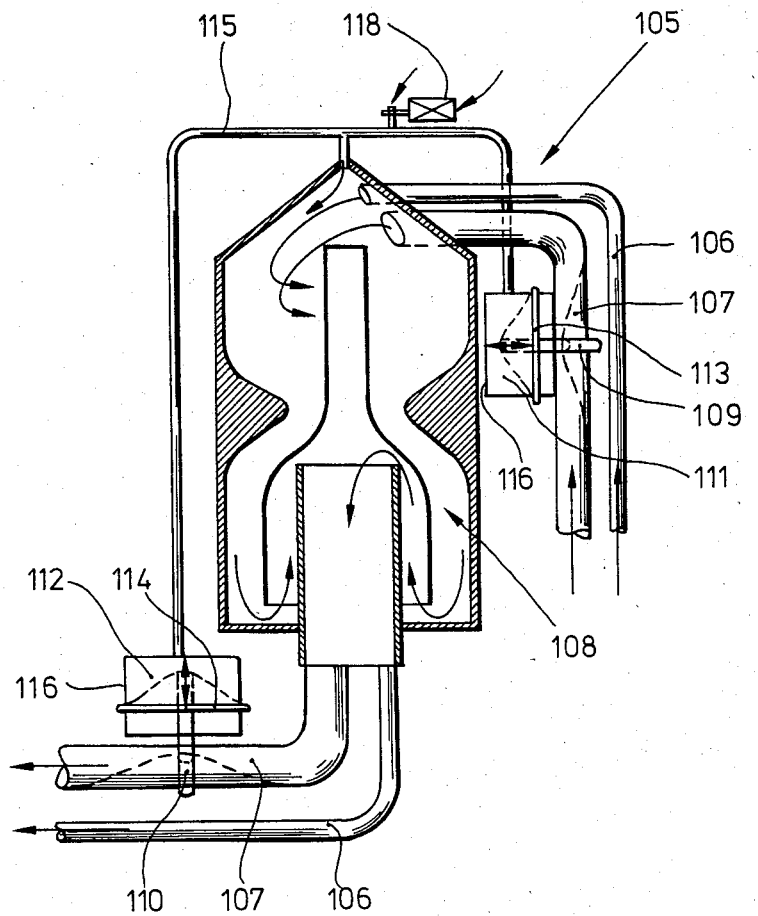
FIG. 16 is a sectional view of an embodiment having a milk flow meter provided in a feedpipe.

A further embodiment is illustrated in FIG. 16, in which the feedpipe is identified generally with reference numeral 105 and is divided into two separate, parallel pipes 106 and 107. An electronic milk flow meter 108 is connected into these pipes in a manner which is described in West German patent application Ser. No. P 31 01 302.3 and therefore is not described here in detail. West German patent application Ser. No. P 31 01 302.3 corresponds to a pending U.S. patent application entitled MILK FLOW METER, Ser. No. 338,930, filed Jan. 12, 1982, the disclosure of which is incorporated herein by reference. The two pipes 106 and 107 preferably have different inner cross sectional areas. The pipe 107 is, at least in the region of clamps 109 and 110, an elastic hose which can be clamped off upstream of the milk flow meter 108 by the clamp 109 and downstream of the milk flow meter by the clamp 110. The clamps 109 and 110 can each be operated by a respective pneumatic operating device 111 or 112. The operating devices 111 and 112 have respective diaphragms 113 and 114 to which the clamps 109 and 110 are secured. When an underpressure is applied to the inner side of the diaphragms, the atmospheric pressure present on the outer side deflects them and causes the clamps 109 and 110 to squeeze the respective hose portions of pipe 107. Applying either an underpressure or atmospheric pressure to the inner side of the diaphragms is effected by a pipe system 115 which communicates with operating chambers 116 and 117 for the clamps 109 and 110, and by a conventional control device 118. Of course, it is also possible, instead of the chambers 116 and 117, the diaphragms 113 and 114, the pipe system 115 and the control device 118, to control the clamps 109 and 110 with electromagnetic operating devices such as solenoids which are controlled by suitable electrical signals from the electrical milk flow meter.

The embodiment of FIG. 16 operates as follows. At low milk flow rates, the meter 108 causes the control device 118 to supply a vacuum to the pipe system 15, thereby causing the diaphragms 113 and 114 to be deflected to the position shown in broken lines in FIG. 16 so that the clamps 109 and 110 squeeze shut both elastic hose portions of the feedpipe 107. Milk thus flows only through the feedpipe 106. If the milk flow rate through feedpipe 106 increases, the meter 108 detects this and causes the control device 118 to supply atmospheric pressure to the pipe system 115, thus releasing the clamps 109 and 110 to permit milk to flow through the feedpipe 107 as well as the feedpipe 106. When the milk flow rate again decreases, the meter 108 responds by causing control device 118 to again actuate the clamps 109 and 110.

The aforedescribed arrangement having an electrical milk flow meter is particularly suitable for applications in which the feedpipe is divided not just into two, but into several parallel pipes, into which as a whole the milk flow meter is inserted. In such a case, it is possible to provide for each pipe a separate valve or blocking device which, approximately in succession and in dependence on the milk flow rate measured by the milk flow meter, can be opened or closed. In this manner, the cross sectional area of the feedpipe available for the milk flow can be controlled very precisely in dependence on the milk flow rate.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for conveying milk, comprising: a milk supply device; a milk discharge pipe provided at a location spaced above said milk supply device; means for producing a vacuum in said milk discharge pipe; and means for conveying milk upwardly from said milk supply device to said milk discharge pipe, including valve means, a first milk pipe providing fluid communication between said valve means and one of said milk supply device and said milk discharge pipe, and second and third milk pipes which each provide fluid communication between said valve means and the other of said milk supply device and said milk discharge pipe; wherein said valve means is responsive to the rate of fluid flow through said conveying means for permitting and substantially obstructing fluid flow through said third milk pipe when the rate of fluid flow through said conveying means is respectively above and below a predetermined milk flow rate.

2. The apparatus according to claim 1, wherein the cross sectional area of the central opening through said third milk pipe is larger than the cross-sectional area of the central opening through said second milk pipe.

3. The apparatus according to claim 2, wherein said valve means includes a cylinder which has a longitudinal bore therethrough and is movably supported within said second milk pipe, and includes said third milk pipe being in fluid communication with said second milk pipe in the region of said cylinder, said cylinder being movable to a position in which it obstructs milk flow through said third milk pipe, and movement of said cylinder away from such position permitting a progressively larger rate of milk flow through said third milk pipe.

4. The apparatus according to claim 2, wherein said valve means includes sensor means which is responsive to the milk flow rate through said conveying means and, when said predetermined milk flow rate is exceeded, opens a diaphragm valve in said valve means which normally obstructs fluid flow through said third milk pipe.

5. The apparatus according to claim 4, wherein said other of said milk supply device and milk discharge pipe is said milk discharge pipe, wherein said diaphragm valve has a control chamber which is in continuous fluid communication through a throttle with the surrounding atmosphere, and wherein said sensor means includes means for providing and interrupting fluid communication between said control chamber and said second milk pipe when the fluid flow rate through said conveying means is respectively above and below said predetermined milk flow rate.

6. The apparatus according to claim 4, wherein said one of said milk supply device and milk discharge pipe is said milk discharge pipe; wherein said diaphragm valve includes a length of a flexible hose which is a portion of said third milk pipe, a control chamber which encloses said hose and is in continuous fluid communication through a throttle with the surrounding atmosphere, and a core which is disposed within said hose and is figure-8 shaped in cross section; and wherein said sensor means includes means for providing and interrupting fluid communication between said control chamber and said first milk pipe when the fluid flow rate through said conveying means is respectively above and below said predetermined milk flow rate, whereby said hose is sealingly pressed against said core so as to obstruct fluid flow through said third milk pipe when the fluid flow rate through said conveying means is below said predetermined milk flow rate.

7. The apparatus according to claim 4, wherein said valve means includes means defining a chamber through which the milk flows, wherein said sensor means includes a float which is vertically movable in said chamber in dependence on the milk flow rate between a first position and a second position, and wherein said sensor means includes means responsive to movement of said float for causing said diaphragm valve to permit and obstruct fluid flow through said third milk pipe when the float is in said first and second positions, respectively.

8. The apparatus according to claim 2, wherein said valve means includes means defining a milk accumulating chamber through which milk being conveyed by said conveying means flows, said chamber being vertically positioned so that a milk level therein lies approximately at the height of said milk discharge pipe.

9. The apparatus according to claim 2, wherein said one of said milk supply device and said milk discharge pipe is said milk supply device; and wherein said valve means includes said first, second and third milk pipes being in fluid communication with each other at a location, includes said third milk pipe being approximately vertical in the region of said location, includes means defining an annular valve seat in said third milk pipe adjacent said location, and includes a ball supported in said third milk pipe on the side of said valve seat remote from said location for movement between positions engaging and spaced from said valve seat.

10. The apparatus according to claim 2, wherein said one of said milk supply device and said milk discharge pipe is said milk supply device; and wherein said valve means includes said first, second and third milk pipes being in fluid communication with each other at a location, includes said second milk pipe being approximately vertical and having an enlarged portion in the region of said location, and includes a cylindrical element which has a central opening therethrough and is supported in said enlarged portion of said second milk pipe for axial movement between positions in which fluid flow into said third milk pipe is respectively obstructed and permitted.

11. The apparatus according to claim 2, wherein said one of said milk supply device and said milk discharge pipe is said milk supply device; and wherein said valve means includes a valve housing having a chamber therein, a flexible diaphragm extending across said chamber and dividing it into first and second portions, said first, second and third milk pipes each communicating with said first portion of said chamber and said diaphragm being movable to a position obstructing fluid flow into said third milk pipe, a control pipe of small diameter which provides fluid communication between said first and second portions of said chamber, a throttle providing fluid communication between said control pipe and the atmosphere surrounding said conveying means, a flap which is movably supported in said first portion of said chamber in the region of said first milk pipe and has a plug thereon which can obstruct fluid flow between said control pipe and said first portion of said chamber, and resilient means yieldably urging said flap toward a position in which said plug is obstructing said control pipe, an increase in the milk flow rate through said first milk pipe to a level above said predetermined milk flow rate causing said flap to be moved against the urging of said resilient means to a position in which said plug thereon is spaced from said control pipe.

12. The apparatus according to claim 2, wherein said one of said milk supply device and said milk discharge pipe is said milk discharge pipe; wherein said valve means includes said first, second and third milk pipes being in fluid communication with each other at a location, includes means defining a valve chamber surrounding a portion of said third milk pipe in the region of said location, includes said portion of said third milk pipe being a flexible hose, includes a core which is supported within said portion of said third milk pipe and has a figure-8 shape cross section, includes a control pipe of small diameter having one end communicating with said control chamber and its other end disposed within said third milk pipe at the upper end thereof and facing said first milk pipe, includes a throttle providing fluid communication between said control pipe and the atmosphere surrounding said conveying means, includes said first milk pipe having an enlarged portion which is in the region of said location and has an annular valve seat at the end thereof nearest said location, and includes a valve member which has a frustoconical surface converging toward said location and which is supported in said first milk pipe for movement between a position spaced from said valve seat and a position in which said frustoconical surface is engaging said valve seat and an end thereof is obstructing fluid flow into said other end of said control pipe, said frustoconical surface having grooves therein which facilitate fluid flow through said first milk pipe past said valve member when said valve member is engaging said valve seat.

13. The apparatus according to claim 2, wherein said one of said milk supply device and said milk discharge pipe is said milk discharge pipe; and wherein said valve means includes means defining a valve chamber, includes said second milk pipe extending into said valve chamber and terminating near an upper end thereof, includes said first and third milk pipes being in fluid communication at a location immediately below said valve chamber, includes means defining first and second passageways providing fluid communication between the bottom of said valve chamber and said first milk pipe, includes manually adjustable reducing valve means for adjusting the rate of fluid flow through said first passageway, includes an overflow pipe providing fluid communication between an upper portion of said chamber and said first milk pipe, includes a float which is supported in said chamber for vertical movement between first and second positions, has a vertical rod thereon which extends downwardly through said second passageway, and has a valve member fixedly secured at its lower end, vertical movement of said float causing said valve member to move between two positions in which said valve member respectively obstructs fluid flow through said third milk pipe and said second passageway, and including magnetic means cooperable with said float in its first and second positions for yieldably resisting movement of said float away from said first and second positions.

14. The apparatus according to claim 2, wherein said one of said milk supply device and said milk discharge pipe is said milk discharge pipe; and wherein said valve means includes a valve housing having a chamber therein and having a vertical slot in one wall thereof which is in fluid communication with said first milk pipe, includes said second and third milk pipes extending upwardly into said chamber and terminating at a location between the top and bottom surfaces thereof, includes a flexible diaphragm extending approximately horizontally across said chamber above said second and third milk pipes so as to divide said chamber into two portions and being movable to a position obstructing fluid flow through said third milk pipe, includes a control pipe of small diameter which provides fluid communication between the portions of said chamber on opposite sides of said diaphragm, includes a throttle which provides fluid communication between said control pipe and the atmosphere surrounding said conveying means, and includes an annular float which encircles said second and third milk pipes, is vertically movable within said chamber, and has means thereon which obstructs and permits fluid flow between said control pipe and the portion of the chamber below the diaphragm when the float is respectively in a first position and a second position above said first position.

15. The apparatus according to claim 2, wherein said one of said milk supply device and said milk discharge pipe is said milk discharge pipe; wherein said conveying means includes a fourth milk pipe which provides fluid communication between said valve means and said milk discharge pipe and has a cross-sectional area which is larger than that of said first milk pipe; and wherein said valve means includes means defining a valve chamber, includes a partition wall which extends upwardly from a bottom surface of said chamber to a location spaced below a top surface thereof and thus divides the chamber into first and second portions, includes said second and third milk pipes extending upwardly into said first portion of said chamber and terminating at a location between the top and bottom surfaces of said chamber, includes said first and fourth milk pipes communicating with a lower end of said second portion of said chamber, includes an annular float which encircles said second and third milk pipes and is vertically movable in said first portion of said chamber, includes a pivotally supported lever in said chamber which is operatively coupled to said float, vertical movement of said float effecting pivotal movement of said lever, and includes two valve members which are supported on said lever and are movable between positions spaced from and obstructing fluid flow through said third and fourth milk pipes, respectively.

16. The apparatus according to claim 2, wherein said one of said milk supply device and said milk discharge pipe is said milk discharge pipe; wherein said conveying means includes a fourth milk pipe which provides fluid communication between said valve means and said milk discharge pipe and has a cross-sectional area which is larger than that of said first milk pipe; and wherein said valve means includes said third and fourth milk pipes each having a portion which is a flexible hose, includes selectively actuable clamping means for releaseably pinching said portions of said third and fourth milk pipes in order to obstruct fluid flow therethrough, and includes sensor means responsive to the rate of fluid flow through said conveying means for actuating said clamping means when the rate of fluid flow through said conveying means is below said predetermined milk flow rate.

17. The apparatus according to claim 2, wherein said valve means includes means defining a chamber which is in fluid communication with said first, second and third milk pipes, a float vertically movably supported in said chamber, and means for respectively obstructing and permitting fluid flow through said third milk pipe when said float is in a first position and a second position above said first position.

* * * * *